United States Patent [19]

Smyth

[11] Patent Number: 4,980,759
[45] Date of Patent: Dec. 25, 1990

[54] CALIBRATION SYSTEM AND METHOD FOR COLOR IMAGE SCANNING

[75] Inventor: William K. Smyth, Sudbury, Mass.

[73] Assignee: Polaroid Corporation, Cambridge, Mass.

[21] Appl. No.: 398,897

[22] Filed: Aug. 28, 1989

[51] Int. Cl.[5] .............................................. H04N 3/14
[52] U.S. Cl. ........................................ 358/75; 358/44; 358/80
[58] Field of Search ...................... 358/75, 80, 213.13, 358/212, 44

[56] References Cited

U.S. PATENT DOCUMENTS

| | | | |
|---|---|---|---|
| 4,136,360 | 1/1979 | Hoffrichter et al. | 358/80 |
| 4,174,528 | 11/1979 | White | 358/280 |
| 4,661,843 | 4/1987 | Sekizawa et al. | 358/80 |
| 4,677,287 | 6/1987 | Ejima et al. | 250/205 |
| 4,687,919 | 8/1987 | Nagano et al. | 250/205 |
| 4,707,615 | 11/1987 | Hosaka | 358/75 |
| 4,710,779 | 12/1987 | Funaki et al. | 346/1.1 |
| 4,712,000 | 12/1987 | Yoshikawa et al. | 250/205 |
| 4,731,661 | 3/1988 | Nagano et al. | 358/75 |
| 4,734,762 | 3/1988 | Aoki et al. | 358/80 |
| 4,745,467 | 5/1988 | Sekizawa et al. | 358/80 |
| 4,812,900 | 3/1989 | Kadowaki et al. | 358/75 |
| 4,862,286 | 8/1989 | Suda et al. | 358/75 |
| 4,866,512 | 9/1989 | Hirosawa et al. | 358/75 |

Primary Examiner—Howard W. Britton
Assistant Examiner—KimYen Vu
Attorney, Agent, or Firm—Edward S. Roman

[57] ABSTRACT

A system and method for calibrating signals provided by individual cells in a photodetector array scanned by light originating at a low-cost variable light source and reflected from a subject to be replicated in digital form by processing photodetector cell signals in a manner so that individual cell signals are corrected to compensate for fluctuations in source light. The system and method is particularly applicable to a color balanced photodetector array in which individual photodetectors are arranged in sets with each set having a variable number of rows oriented in a direction transverse to the direction of scan and columns parallel to the direction of scan. The invention is practiced by exposing the first few photodetectors in each row to the full spectrum of visible light reflected from a white reference patch. During processing, as the photodetector signals are sequentially transferred, to a processor, the signals provided by the cells exposed to the white reference are compared with a fixed value to obtain a calibration factor. As the signals develop by cells in the same set but as a result of exposure to light reflected from the subject image, those signals are multiplied by the calibration factor so that the process signals are corrected for variations in source light on a real time basis.

10 Claims, 3 Drawing Sheets

CALIBRATION SYSTEM AND METHOD FOR COLOR IMAGE SCANNING

BACKGROUND OF THE INVENTION

This invention relates to electronic image scanning and processing and, more particularly, to the calibration of photodetector output to compensate for intensity and color temperature variation in subject illumination by a low-cost source of illumination.

In a commonly assigned, co-pending U.S. patent application entitled "COLOR BALANCED IMAGE DETECTOR SYSTEM", Ser. No. 328,314, filed Mar. 13, 1989, there is disclosed a color balanced imaging system in which plural (e.g. 3) sets of photodetectors are exposed to a light image reflected from a subject, which may be represented by a color photograph, for example, in a manner to achieve a high resolution, accurate color rendition of the image in digital form. The photodetector sets are exposed by scanning the subject image with white light so that light reflected from a given picture element or "pixel" in the subject image will impinge each individual photodetector located in the scanning path. To this end, the photodetectors in each set are arranged in adjacent rows transverse to the scanning path and in columns parallel to that path. Where the subject reflects only light in the visible spectrum, each set of the photodetectors is exposed through a filter which could represent one of the primary colors, that is, red (R), green (G), or blue (B). Alternatively, the filters could represent the complimentary colors.

Color balance in the system of the aforementioned co-pending application is achieved by a combination of selecting the number of photodetector rows in each set to correspond with the sensitivity of the photodetectors to the light in the R, G and B spectral regions and by accumulating the charge developed by photodetectors in each column of each set so that the output signal for each subject image pixel is the composite output of the photodetector rows. For example, the photodetectors are most sensitive to red light and least sensitive to blue light. Thus, the photodetector set exposed through the red filter will have as few as six active rows of photodetectors where as the blue set will have as many as sixteen photodetector rows. As light reflected from each image pixel scans or traverses the photodetectors in a column common to all three sets, the R, G or B spectral components in the pixel develop a charge in each photodetector underlying a filter which passes a spectral component in the pixel. The photodetector charges are accumulated in each photodetector set in a manner such that each successive photodetector in a column receives the charge of a photodetector immediately preceding it in the context of scanning direction and also adds its own charge to the accumulating charge. As a result of the accumulation of charges, each image pixel is represented by a well developed photodetector signal capable of being processed electronically to develop a digital emulation of the subject image. Moreover, an exceedingly high measure of color balance is achieved simply by variation in the number of photodetectors exposed to the respective R, G and B spectral components of each subject image pixel.

While the afore-mentioned scanning system represents a major advance in the attainment of data accurate with respect to color balance, the overall quality of data obtained by image scanning is dependent also on uniform intensity and color temperature of the source of the illumination reflected from the subject image to the photodetector sets. If a low-cost tungsten halogen bulb powered by line voltage, for example, is used as the source of image scanning illumination, the intensity of light reflected from the subject image to the photodetectors will vary with normally incurred line voltage variations including the sixty cycle ripple associated with line voltage. Also, the color temperature of such a light source is unstable particularly during the period immediately after the lamp is turned on. Quite obviously, the signals generated by the photodetectors exposed to such a light source will vary with the voltage variation induced intensity of the light, and with color temperature variation where photodetector signal strength is predicated on response to a limited spectrum of the reflected light.

The problems associated with intensity and color temperature variation in low-cost light sources for image scanning applications have been addressed in the prior art. For example, U.S. Pat. No. 4,174,528 and the prior art cited therein as background art teach the use of a white reference image or patch in the light path between the light source and a photodetector array for the purpose of calibrating the output of the array to compensate for variations in exposure light intensity and color temperature. In many of the prior art disclosures, the white reference patch is exposed to the photodetectors only at the beginning of an image scan. It is obvious that this approach to photodetector calibration is effective only in a very general way and would not account for cyclical variations in light intensity variations which occur during the scan of a single subject image. The disclosure of U.S. Pat. No. 4,174,528, on the other hand, approaches a scanner calibration procedure by which photodetector calibration is accomplished on a line-by-line basis. Specifically, a linear detector array provided for reading the document or subject image includes a detector in the path of light reflected from reference indicia and associated with an exposure meter circuit. When light reflected from a given line of image pixels is read by the photodetector array, the quantity of light read by the exposure meter associated detector is integrated and stored in a manner to control the exposure of the image sensing photodetectors in the next line of pixels. This system operates in the manner of an electronic shutter by which the time during which the detectors are exposed to light reflected from the subject image is controlled by the exposure meter circuit.

From the standpoint of adapting the exposure control arrangement of the afore-mentioned U.S. Pat. No. 4,174,528 to the system described with reference to the afore-mentioned co-pending patent application in which the charges developed by individual rows of photodetector cells are accumulated to achieve color balance, several problems arise. For example, where the photodetector cell charges are accumulated in successive rows, it is essential that the rate of photodetector charge transfer is identical to the rate of image pixel scan. Although it might be possible to vary the rate of scan to accommodate a variable exposure time interval for each row of photodetectors, the costs of doing so are likely to be greater than the costs of a non-variable light source. Also the resolution requirements for reproducing a subject image represented by a color photograph, for example, require a photodetector cell density of a magnitude making it extremely difficult to accommodate circuity associated with electronic shutter operation. Finally, the attainment of digital data capable of reproducing a high resolution subject image, such as a color photograph, requires that photodetector cell calibration be accomplished on a real time basis, that is, so that the photodetector cells in each row scanned by the subject image are calibrated on the basis of light to which they are actually exposed.

In light of the foregoing, it will be seen that there is a need for an effective photodetector calibration system for the color balanced scanning technique of the type in which photodetector output is the result of the transfer and accumulation of successive cell charges.

SUMMARY OF THE INVENTION

In accordance with the present invention, a system is provided for calibrating the output of image scanning photodetector cells to compensate for variations in light emanating from a low-cost light source, on a real time basis, and in a manner enabling the use of a sufficiently dense pattern of cells to obtain a high resolution digital replica of an image exemplified by a color photograph. Where the image scanner employs an accumulating charge transfer arrangement of photodetector rows, the first few cells in each photodetector row are exposed to illumination reflected from a white reference patch in a manner so that any variation of charge produced by those cells from an arbitrary normal value is used as a calibration factor for the image light scanned cells in the same row.

The invention is practiced by serially transferring the charge signals of each photodetector row to a multiplying processor. The signals resulting from exposure of the first few photodetector cells in a row to the white reference sample are multiplied by 1 and the value compared with a constant reference value. The constant reference value is divided by the incoming white reference signal value to achieve a calibration factor. As the signals developed by photodetector cells in the same row but scanned by subject image pixels are fed to the processor, they are multiplied by the calibration factor to correct for exposure light intensity variations from that represented by the constant reference value.

In a photodetector array which includes sets of photodetector rows and transfer circuitry for accumulating the cell charges developed by the image illumination scan the provision of white reference patch reading cells in each row of a set results in an accumulation of white reference charges corresponding directly to the accumulated charges of image pixel reading cells. When the set is exposed through a filter passing light of a limited spectral region, such as red, green or blue light, variations in illumination color temperature will be accounted for as variations in intensity at each row of photodetector cells. Because the calibration for light intensity variation is performed on the raw signal data transferred from the photodetectors and because all photodetector cells in each row, including cells reading image pixels and cells reading the white reference patch, are exposed by the same line increment of illumination, variations in that line increment of illumination caused by fluctuations at the light source may be measured and corrected in real time for each line of photodetectors scanned.

A principal object of the present invention is, therefore, the provision of an improved calibration system and method by which the output of a photodetector array scanned by imaging illumination originating in a low-cost and variable light source may be corrected in real time to obtain data quality commensurate with precisely uniform illumination sources. Another object of the present invention is to provide such a calibration system and method which enables the use of a dense pattern of photodetectors consistent with providing digital data replicas of high resolution color photographs. Still another object of the present invention is to provide a photodetector calibration system and method suitable for use with color balanced image scanning photodetector sets in which each of multiple sets includes a variable number of photodetectors depending on photodetector sensitivity to differing spectral regions of light. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
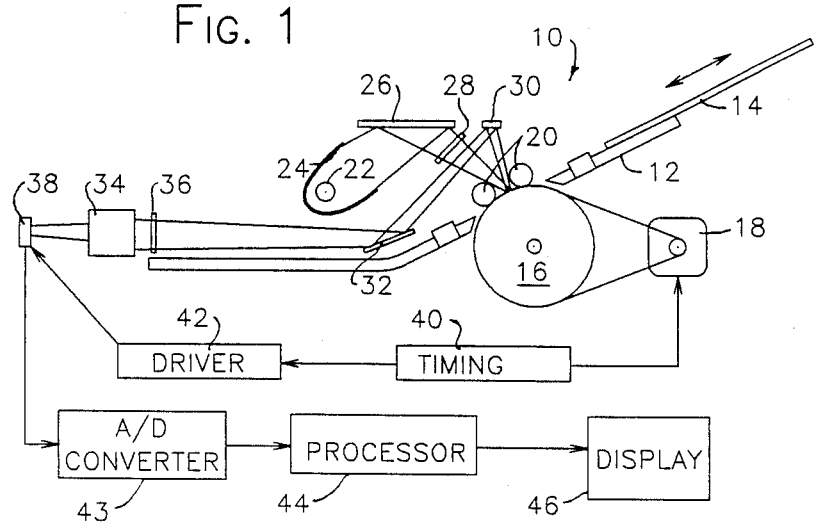
FIG. 1 is a schematic side elevation of components used in an image scanner with which the present invention is particularly suited for use.
Figure 2:
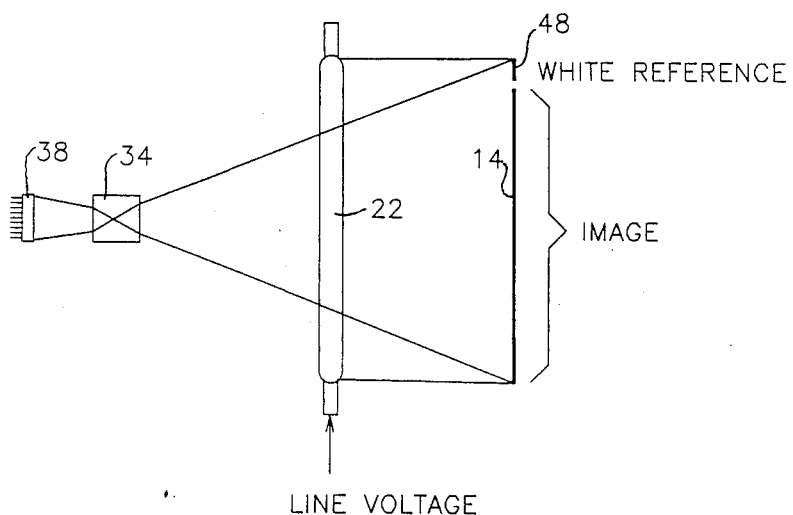
FIG. 2 is a schematic plan view of the optical system employed in the apparatus of FIG. 1.

In FIGS. 1 and 2 of the drawings, an image scanning apparatus is generally designated by the reference numeral 10 and shown to include components substantially identical to those disclosed in the afore-mentioned co-pending U.S. patent application Ser. No. 328,314. While the system 10 is substantially fully disclosed in the afore-mentioned co-pending application, the general organization and operation of the system is worth repeating here in the interest of a full understanding of the calibration system of the present invention.

Thus, in FIG. 1, the scanning system 10 is shown to include a bed 12 on which a subject 14 is placed for engagement by a rotatable drum 16 driven by a stepping motor 18. The subject 14 passes between the periphery of the drum 16 and a pair of pressure rollers 20 in a manner to attain a secure frictional engagement of the subject 14 between the drum 16 and the rollers 20. A source of illumination, represented by a tungsten halogen tube 22 positioned within a focusing reflector 24, develops a path of illumination from the bulb 22 to the section of the drum periphery located between the pressure rollers 20 with the aid of a mirror 26 and a polarizer 28. Illumination reflected from the same peripheral region of the drum 16 is folded by mirrors 30 and 32 and passed to a focusing lens 34 through a second polarizer 36. Illumination focused by the lens 34 is passed to a photo detector array 38 to be described in more detail below. As depicted in block diagram form in FIG. 1, the system includes an electronic timing device 40 such as a clock generator which outputs to the stepper motor 18 and to a driver 42 for the photodetector array 38 to synchronize operation of the motor and the photodetector array 38 in a manner to be described in more detail below. Output from the photodetector array 38 is digitized by way of an analog to digital (A/D) converter 43 and then fed to a processor 44 and ultimately to a display 46, again in a manner to be described in more detail below.

The folded path of illumination from the bulb 22 to the photodetector array 38 is generally depicted in the plan view of FIG. 2 of the drawings. The illustrated illumination path represents a departure from the illumination path of the image scanning system disclosed in the afore-mentioned co-pending application in that, in addition to light reflected from the image on the subject 14 as it passes over the drum 16, illumination is also reflected from a white reference patch 48 which may be represented in practice by a stationary white patch of dimensions corresponding to the width of the illumination scan at the periphery of the drum 16 but located on the housing (not shown) which supports the drum 16 for rotation. The white reference patch 48 may take other physical forms such as a white band on the edge of the drum 16 adjacent to the position of the drum occupied by the subject 14 or it may be represented by a white border along one longitudinal edge of the subject 14. Regardless of the specific physical form taken by the white reference patch 14, it represents a reference patch of white light by which illumination originating with the bulb 22 is reflected through the lens 34 and focused along one edge of the photodetector array 38 simultaneously with light reflected from the image on the subject 14.

Figure 3:
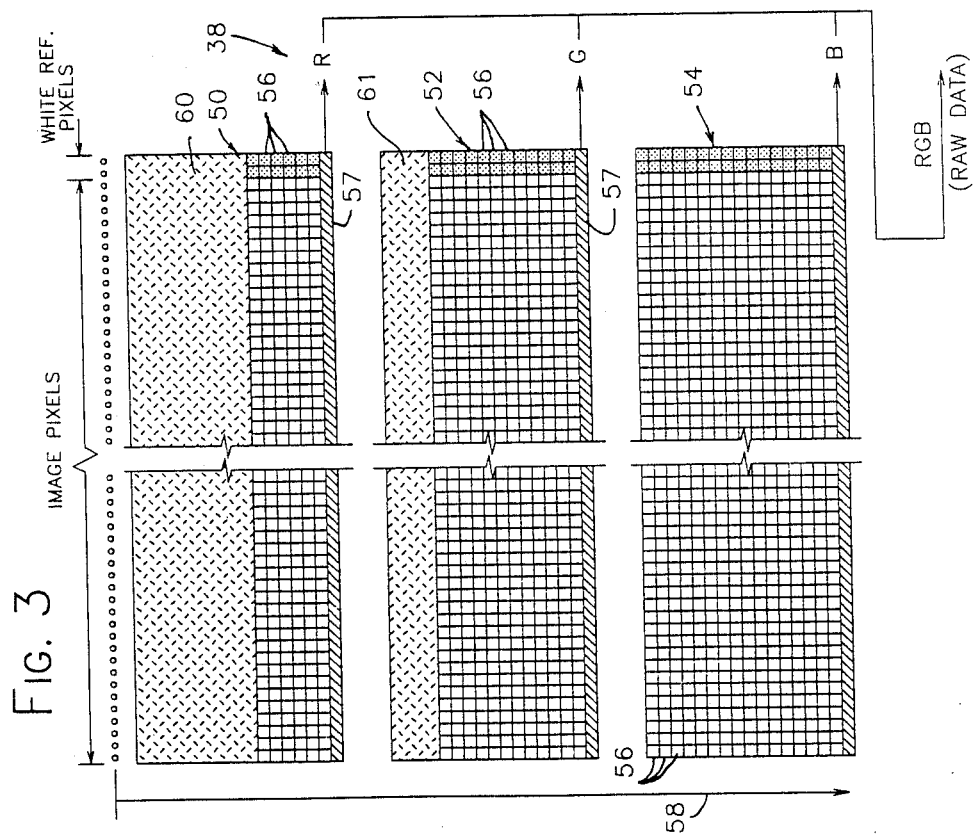
FIG. 3 is a front elevation depicting the physical arrangement of photodetector sets used in the image scanning device of FIG. 1.

In FIG. 3 of the drawings, the physical organization of the photodetector array 38 is depicted in relation to a single row of pixels reflected from the subject 14 and the white patch 48. It should be noted with respect to FIG. 3 that while the pixels are shown as arranged on a single line, the image elements or pixels on the subject, as well as in the reflected light image of the subject forwarded by the lens 34, are randomly distributed in accordance with the image information they represent. On the other hand, because of the geometry of the photodetector cells in the array 38, the pixels are resolved into a series of adjacent linear rows not unlike the single row illustrated in FIG. 3.

The photodetector array 38 is similar to that disclosed in the afore-mentioned co-pending application in that it is comprised of three photodetector sets or circuit modules 50, 52 and 54. Each module contains sixteen rows 56 of photodetector cells, the rows being oriented transverse to the direction of image scan as represented by the arrow 58. The individual cells in the rows 56 are also arranged to be aligned as columns which extend parallel to the direction of image scan. Although not illustrated in FIG. 3 of the drawings, each of the modules 50, 52 and 54 is covered by a filter (not shown) corresponding to the basic red, green and blue spectral regions of visible light. Specifically, the module 50 includes a red filter which covers all of the active cells thereof whereas the module 52 is exposed through a green filter and the module 54 through a blue filter. Because the photodetector cells are most sensitive to red light and least sensitive to blue light, the red module 50 is covered with a mask 60 leaving only six active rows 56 of photodetector cells. In the blue module 54, all sixteen rows 56 are active whereas in the green module 52, a mask 61 is again incorporated to expose only twelve active rows 56 of photodetector cells.

In the illustration of FIG. 3, the first two columns of photodetector cells in each module 50, 52 and 54 are stippled to delineate them from the other columns of photodetector cells. While the stippled cells are identical in all respects to the other cells, they are delineated because they are exposed to light reflected from the white reference patch 48 whereas the other cells are exposed to light reflected from the subject 14. While the first two cells are shown as reserved for exposure by light reflected from the white patch 48, it is contemplated that as many as 20 columns of pixels may be used for this purpose. Also in FIG. 3, the final row 57 in each module 50, 52 and 54 is delineated by cross-hatching and while comprising the same cells as the rows 56, is provided with circuitry to be described and by which it functions as a shift register.

Figure 4:
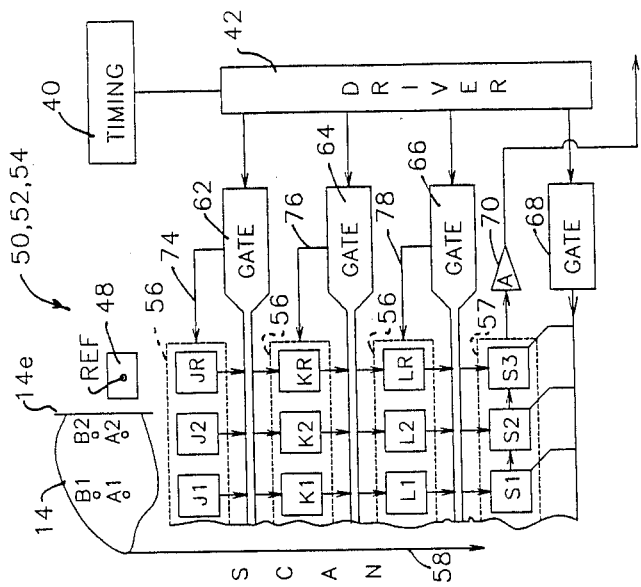
FIG. 4 is a fragmentary schematic view depicting operation of the photodetector array employed by the present invention.

The basic operation and circuity of the photodetector sets or modules 50, 52 and 54 may be appreciated by reference to FIG. 4 in which a vastly enlarged fragment of three detector rows 56 and a shift register 57 are shown. With the exception of the color filter associated with each module and the masks 60 and 61 of the modules 50 and 52, each of the modules 50, 52 and 54 is identically constructed.

In FIG. 4, the subject 14 is shown as having an arbitrary shape extending from one linear edge 14e and further includes two rows of two pixels each. The pixels are presented as little circles identified by the legends A1,A2 in the first row, and B1,B2 in the second row. A single reference pixel (REF) is shown as aligned with the row A1,A2 of image pixels and is presented in the light image to which the modules 50, 52 and 54 are exposed by the same linear increment of light as the image pixels in that row. In this respect, while the white reference patch 48 from which the reference pixel emanates may remain stationary while the subject 14 is moved in the scanning path represented by the arrow 58, the linear increment of light reflecting a specific individual row of image pixels will also reflect the reference pixel.

In an electronic circuit context, the rows 56 of the photodetector cells in each module 50, 52 and 54 are embodied as registers. In a preferred embodiment, sixteen of the registers are employed in each module with each register having two thousand forty-eight cells capable of light detection. As indicated, a shift register 57 is employed at the trailing end of each module for extracting signal samples obtained from the detection of light by cells of the respective modules. The signal samples are obtained from a plurality of the other sixteen registers 56.

By way of example and in the interest of simplicity, the illustration of the circuit module in FIG. 4 contains a total of only three registers 56, each of which has only three cells. In the uppermost register 56, the cells are identified by the legends J1, J2 and JR; in the next register 56 the cells are identified by the legends K1, K2 and KR; and in the following register the cells are identified by the legends L1, L2 and LR. These three registers are employed for the detection of light. The last of the registers 57 at the bottom of the array of FIG. 4, has cells identified by the legends S1–S3 and is employed for extracting signal samples from the module. Also included within the circuit module is a set of gates 62, 64, 66 and 68 which are driven by the gate driver 42. An amplifier 70 is connected to the output terminal of the shift register 57 for applying signals put out by the shift register 57 to the signal processor 44.

In operation, the gate 62 applies a signal via a line 74 to activate an electrode assembly (not shown) in each of the cells J1, J2, JR to render these cells responsive to incident light for detecting the light during a sampling interval of time designed by an electric pulse signal on the line 74. Similarly, the gate 64 applies a sample pulse signal via a line 76 to activate the corresponding electrode structures (not shown) of the cells K1, K2 and KR, and the gate 66 similarly applies, via a line 78, an electric pulse signal to the electrode structures of the cells L1, L2 and LR to initiate sampling of the incident light by the cells. Circuitry of the gate 62 also extends between the first two registers 56 for transferring charge between a first cell in each column to a second cell in each column. Thus upon activation of circuitry within the gate 62, a charge in the cell J1 is transferred into the cell K1, a charge in the cell J2 is transferred to the cell K2 and a charge in the cell JR is transferred to the cell KR. In a similar fashion, circuitry of the gate 64 and of the gate 66 provides for further transfer of the charges among the cells of the individual columns, namely, successive transfers of charge among the cells K1-L1-SI, K2-L2-S2, and KR-LR-S3. Circuits of the gates 62, 64, 66 and 68 are activated by the driver 42 in response to signals of the timing unit 40. The array of charge-coupled devices or cells of the four registers 56, in conjunction with the circuits of the gates 62, 64, 66 and 68 operate in accordance with a gating procedure known as a three-phase gating operation.

The aspect of summation for integration of the signals obtained from each pixel of the subject for forming the corresponding pixel of the image may be explained with reference to FIG. 4. Consider the pixel A1 in the subject 14. During an early part of the scan, the pixel A1 reflects light of the lamp 22 to be detected by the cell J1 of the charge-coupled device of the register 56. The cell J1 produces an electric charge proportional to the reflectivity of light from the pixel A1. The resulting charge produced in the cell J1 is transferred by the gate 62 to the cell K1. Subsequently, as the scanning motion of the rays of light continue, rays of light from the pixel A1 impinge upon the cell K1. At this point in time, the driver 70 activates circuitry of the gate 64 to energize the electrodes structure of all of the cells of the second register 56, thus enabling the cell K1 to sample the light from the pixel A1.

Upon a sampling of light of pixel A1 by cell K1, additional charge is produced by the cell K1. The total charge now present in the cell K1 is equal to the sum of the charges produced by the detection operations of cells J1 and K1. Thereafter, the gate 64 transfers the charge from K1 to the cell L1, this being followed by a further sampling of light of the pixel A1 with the further production of charge to produce a total charge accumulation in the cell L1 equal to the sum of the charges produced by the detection of light from the pixel A1 by the cells J1, K1 and L1.

At the time when the cell K1 is being activated to sample light of the pixel A1, the cell J1 is being activated to sample light of the pixel B1. Therefore, the sum of charges appearing in cell L1 at the conclusion of three sampling intervals of the pixel A1 is succeeded in next sampling interval with a sum of the charges from the sampling of the pixel B1. Similar comments apply to the summation of pixel signals via the columns J2-K2-L2 and JR-KR-LR. At the conclusion of the sampling of the respective rows of pixels by the third register 56, the resultant accumulated charges are transferred by the gate 66 to the corresponding cells S1-S3 of the shift register 57. Thereupon, the gate 68 is activated by the driver 42 in response to timing signals from the timing unit 40 to strobe the cells S1-S3 to shift the charges through the register 57 and via the amplifier 70 to the signal processor 44. Thus, the accumulated charge in cell S3 is transferred out by the amplifier 70, the accumulated charge in the cell S2 is transferred into the cell S3, and the accumulated charge of the cell S1 is transferred into the cell S2. Subsequent transfers allow the various quantities of charge to move sequentially through the cells of the shift register 57 to the converter 43 and processor 44 for subsequent use in forming the image at the display 46. The charges of the shift register 57 are cleared out completely prior to the next sampling interval, so as to be ready to receive charges from the next row of pixels.

From the foregoing description of the photodetector sets or module 50, 52 and 54 in the array 38 and associated circuitry, it will be appreciated that as each set of rows or registers 56 of photodetector cells is scanned by light reflected from the subject 14 and the white reference patch 48, digital signals corresponding to the pixels in each row will be sent to the processor 44 sequentially. Moreover, because the first two or more cells in each row 56 represent signals developed by light reflected from the white reference patch 48, the individual signals developed in the cells exposed to the white reference patch will precede the signals developed by cells exposed to the image of the subject 14. The manner in which this sequence of signal transfer from the photodetector array 38 to the processor 44 is used to correct for variations in illumination originating with the lamp 22 from a preestablished normal or reference value may be understood by reference to FIGS. 5A and 5B of the drawings. These figures illustrate in block diagram form, the processor 44, an output lookup table 80, a calibration lookup table 82 and a calibration factor storage unit 84. The block diagram illustrations in FIGS. 5a and 5b, respectfully, are identical with the exception of the arrow lines 86 and 88 which, when present, indicate the passage of information between the components which they connect during different states of processor operation. Also for purposes of facilitating an understanding of the present invention, the processor 44 may be considered simply as a multiplier by which data input to a port A is multiplied by a value at the port B so that the output of the processor is the product of the two input factors or $A \times B$.

Figure 5A:
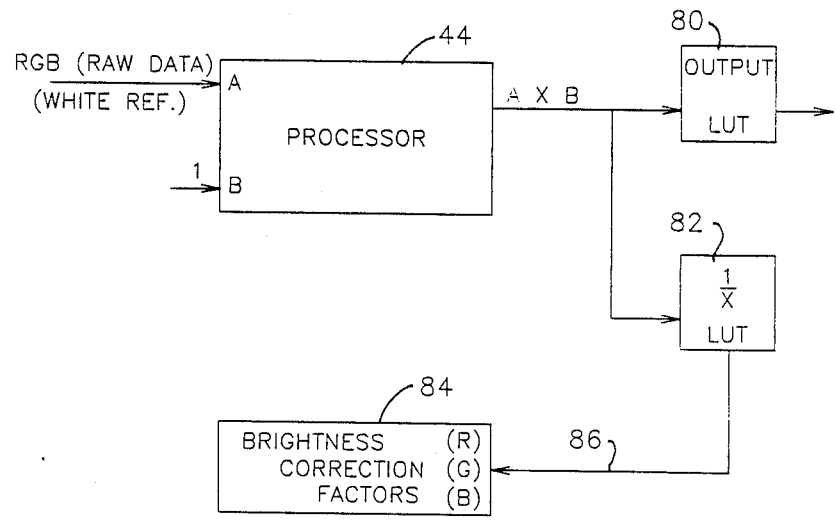
FIGS. 5A and 5B are block diagrams representing identical components but in different states of operation.

In FIG. 5A, the processor is conditioned to receive the signals originating with each set of photodetector cells exposed to light reflected from the white reference sample 48. At the time these signals are input to the port A of the processor 44, port B is fixed at a default setting of unity or one. The signal strength of the white reference data is processed and assigned a calibration value (X) corresponding to the signal strength input to the port A but selected to lie in a range from a numerical value of less than one and greater than zero. The product of white reference raw data signals thus derived are output from the processor and sent to the lookup table 82 at which the reciprocal of the numerical value X of the white reference signal strength value is derived and sent to the calibration storage unit 84. The operational state of the circuitry is then shifted to the condition depicted in FIG. 5B of the drawings as the signals input to the port A of the processor 44 shift to the signals developed by photodetector cells in the same set but exposed to image pixels. At the same time, the calibration factors previously computed and stored in the unit 84 are input to port B. The processor 44 now multiplies the signals sequenced into the port A by the calibration factor 1/X and outputs the corrected signal values for presentation of a replica of the subject image 14 at the display 46. This cycle is repeated for each sequence of signals generated by the exposure of each set of photodetector cell rows or registers as they are scanned by a line of pixels reflected from the respective white reference patch 48 and the subject image 14.

Figure 5B:
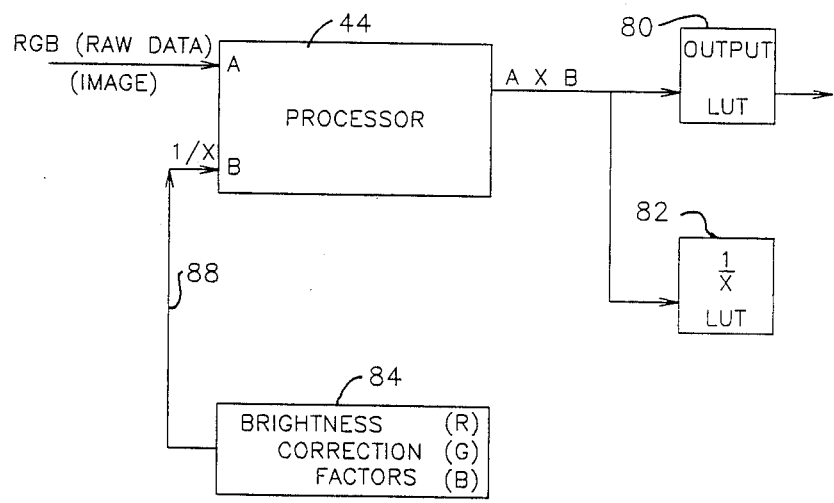

It will be apparent from the described operation of components represented in FIGS. 5A and 5B that any variation in the intensity of light emanating from the source 22 and to which any one of the photodetector cell registers 56 is exposed, will be accounted for by the contribution to processing calibration of signals developed by that row. Moreover, because the cells exposed by reflection of light from the white reference patch are exposed through the same R, G or B filter through which the image reading cells in the same row are exposed, any fluctuation in color temperature at the light source 22 will be detected and corrected for as a variation in intensity of light at the respective R, G and B wavelengths.

Thus it will be appreciated that as a result of the present invention, the highly effective calibration system and method is provided for color image scanning systems and by which the stated objectives, among others, are fully realized. Also, it will be apparent to those skilled in the art from the preceding description and accompanying drawings that modifications and/or changes may be made in the described embodiment without departure from the invention. Accordingly, it is expressly intended that the foregoing description and accompanying drawing illustrations are illustrative of a preferred embodiment only, not limiting, and that the true spirit and scope of the present invention be determined b reference to the appended claims.

I claim:

1. In an image scanning system having a light source and a plurality of photodetector cells arranged in at least one set comprising an othogonal pattern of plural rows and columns, means for scanning said photodetector cells with image light originating at said light source and reflected from a subject in a direction transverse to said rows, and means for operating said cells so that each row is exposed to a linear increment of said image light the improvement comprising:
    means for exposing at least the first cell in each row to the full spectrum of light emanating from said light source;
    means for summing signals provided by said photodetector cells in each column of each set to provide column signals in an ordered sequence from a first of said columns to a last of said columns;
    means for processing at least said first column signal to obtain a calibration factor representing variation of light value emanating from said light source from a fixed value for said one set of photodetector cells; and
    means for multiplying each column signal provided for each column of said one set of photodetector cells succeeding said at least first column signal by said calibration factor.

2. The image scanning system of claim 1, wherein the number of photodetector cells in each row is on the order of 2,000 and wherein the number of cells in each row exposed to the full spectrum of light emanating from said light source is in the range of between 1 and 20.

3. The image scanning system of claim 1, wherein said means for exposing the first cell in each row to the full spectrum of light emanating from said source includes a white reference patch aligned with a portion of the subject from which light is reflected.

4. The image scanning system of claim 1, wherein said rows of photodetector cells are arranged in plural sets so that the cells of each set detect a spectral portion of light different from the spectral portion of light detected by another of said sets, whereby said calibration factor represents light value variation in the respective spectral portions of light to which each row is exposed.

5. The image scanning system of claim 1, wherein said calibration factor is of a numerical value greater than one.

6. In an image scanning system having a light source and a color balanced detector array including plural sets of detectors, each of said detectors detecting light from a subject, the detectors of each of said detector sets detecting a spectral portion of the light different from the spectral portion of the light detected by the detectors of another of said detector sets; means for scanning light from successive portions of the subject to said detector sets along a predetermined scanning path; and wherein each of said detector sets comprises a plurality of detectors arranged in rows and columns, the columns being parallel to said scanning path and the rows being transverse to said scanning path, each of said detectors providing a signal in response to a detection of light; and means synchronized with said scanning means for triggering said detectors to provide their respective signals in synchronism with the scanning along said scanning path; and means for retrieving column signals of the respective detector sets to provide imaging data of said subject, the improvement comprising:
    means for exposing at least the first detector in each row of a set of detectors to the full spectrum of light emanating from said light source;
    means for summing signals provided by said detectors in each column of each set to provide column signals in an ordered sequence from a first one of the columns to a last one of the columns;
    means for processing at least said first column signal of each said set to obtain a calibration factor representing variation of light value emanating from said light source from a fixed value for that set; and
    means for multiplying each said column signal succeeding said at least first column signal for that set by said calibration factor.

7. The image scanning system of claim 6, wherein said means for exposing at least the first detector in each row to the full spectrum of light emanating from said light source comprises a white reference patch adjacent to the subject from which light is reflected to the remaining detectors in each row.

8. The image scanning system of claim 7, in which the subject is advanced linearly relative to a fixed band of light emanating from said light source and wherein said a white reference patch is positioned along one side of the subject.

9. The image scanning system of claim 8, wherein said white reference patch is fixed in said band of illumination.

10. The method of calibrating the output of an image scanning photodetector array in which photodetector cells are arranged in at least one set comprising rows and columns with the rows oriented in a direction transverse to the direction of scan and in which signals are provided by the individual cells in response to exposure by light image pixels in turn developed by reflection of source light from a subject, said method comprising the steps of:

exposing at least the first cell in each row to the full spectrum of light emanating from said source light;

summing signals provided by the cells in each column of each set of photodetector cells to provide column signals in an ordered sequence from a first one of the columns to a last one of the columns;

processing at least the first column signal to obtain a calibration factor representing variation of said source light from a predetermined value; and multiplying each column signal provided for each column succeeding said at least first column signal by said calibration factor to compensate for variations in light originating with said source light.

* * * * *